United States Patent Office 2,722,615
Patented Nov. 1, 1955

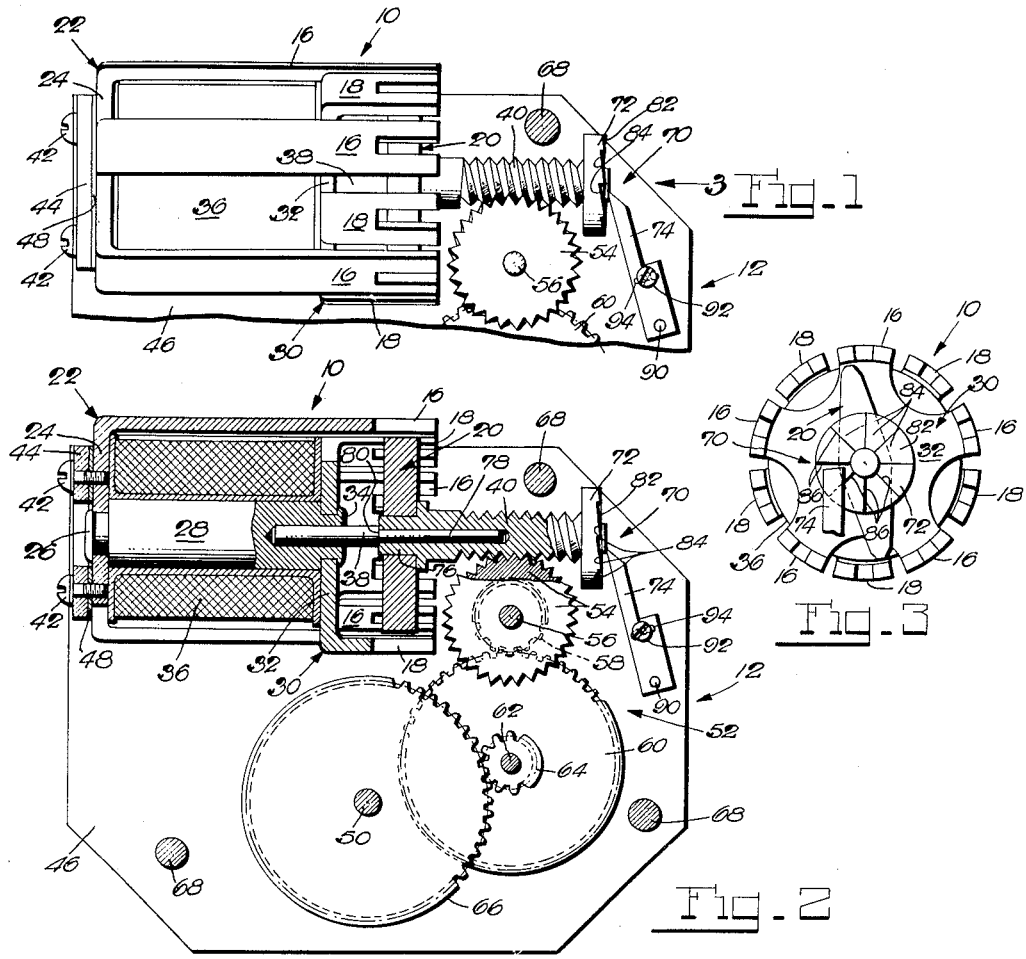
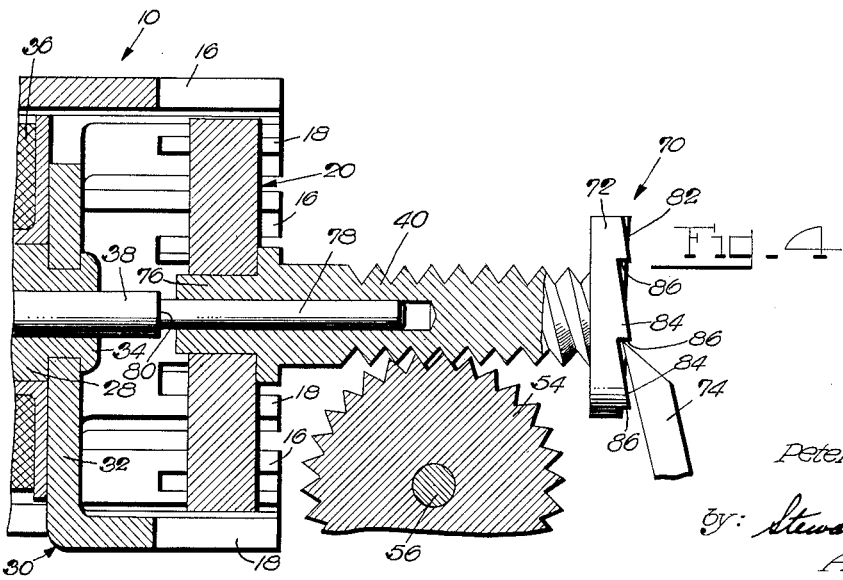

2,722,615

DIRECTIONAL DRIVE CONTROL FOR SELF-STARTING SYNCHRONOUS MOTOR

Peter H. Morganson, Winsted, Conn., assignor to The William L. Gilbert Clock Corporation, Winsted, Conn., a corporation of Connecticut Application December 28, 1953, Serial No. 400,613

21 Claims. (Cl. 310—41)

This invention relates generally to alternating current motors of the self-starting, synchronous type, and more particularly to means for rendering motors of this type of unidirectional driving rotation.

Self-starting motors of this type will start in either direction, depending on the initial polarities of the field poles on energization of the associated field coil and on other factors, whereas motors used in timepieces and most other devices must have a unidirectional drive. To achieve unidirectional drive of motors of this type, recourse has heretofore been had to different expedients for reversing a motor when starting in the wrong direction, such expedients including ratcheting arrangements as well as the use of mutilated gearing providing operative meshing engagement only when driven in one direction. Both such contrivances are subject to disadvantages, not only with respect to constancy of driving torque but also from the standpoint of causing excessive mechanical wear of the parts.

It is the primary aim and object of the present invention to provide for a self-starting synchronous motor a directional drive control which is superior to the aforementioned previous controls by neither adversely affecting the constancy and magnitude of the torque delivered by the motor, nor requiring any wear-inducing and potentially dangerous play between gears that are driven while the motor is running.

It is another object of the present invention to provide in a self-starting synchronous motor a directional drive control which is responsive to wrong-direction drive by the motor of a torque-transmitting gear train and co-operates with the latter in reversing the motor drive, but does not cooperate with this gear train in any way during normal correct drive of the latter by the motor and, hence, cannot in any way affect either the constancy or the magnitude of the torque delivered by the motor. More specifically, the invention contemplates the use of a worm secured to the rotor or rotor shaft of the motor, this worm being in continuous meshing engagement with a worm gear forming part of a conventional gear train. The worm and rotor are arranged for limited axial shifting movement, and the gear train produces sufficient resistance to the rotation of the worm gear such that rotation of the worm produces an axial thrust tending to shift it and its associated rotor axially of the motor in a direction dependent upon the direction of rotation of the worm. Thus, when the worm rotates in a desired direction, the axial thrust is such as to urge the rotor assembly against a thrust bearing, in which position continued rotation of the rotor and worm can occur for normal drive of the gear train. On a wrong-direction start of the rotor, however, axial shifting of the rotor and worm in the opposite direction occurs and brings into operation stop or impact elements of which one is fixed and the other is carried by the aforesaid worm so that the stop element on the latter will be carried into impact with and will rebound from the fixed stop element, and hence reverse the motor drive. That is, the driven worm will, on each start of the motor in the wrong direction, follow the path of least resistance and creep in screw-fashion from its normal driving position rather than remain therein and drive the worm gear in the wrong direction.

Another object of the present invention is to arrange the aforementioned torque-transmission gear train from the motor so that the worm is the initial torque-transmission element thereof, thereby to preclude even momentary transmission by the gear train of motor torque in the wrong direction if the motor should start in the wrong direction.

It is another object of the present invention to provide for a clock or other timing movement a power drive which despite the provision of the aforementioned worm and worm gear for directional drive control may well be lower in cost than conventional power drives for similar movements. For example, the worm or driving screw, and the meshing driven gear or worm gear if that too is of the helical type, while more costly than spur gears, more than make up for their higher cost by achieving substantial savings in several respects, such as exceedingly low cost of the aforementioned stop elements which complete the directional drive control, the use of a faster motor of fewer field poles and, hence, lower cost due to the very substantial speed reduction afforded by the worm and worm gear, and a minimum number of reduction gears in the drive of the movement also due to the speed reduction afforded by the worm and worm gear.

Further objects and advantages will appear to those skilled in the art from the following, considered in conjunction with the accompanying drawings.

In the accompanying drawings, in which certain modes of carrying out the present invention are shown for illustrative purposes:

Fig. 1 is a fragmentary side view of a power drive for a movement embodying the directional drive control of the present invention;

Fig. 2 is a longitudinal section through the same power drive with its directional drive control;

Fig. 3 is an end view of a part of the power drive and its directional drive control as seen in the direction of the arrow 3 in Fig. 1; and Fig. 4 is an enlarged fragmentary section through the power drive with its directional drive control in operation.

Referring to the drawings, and more particularly to Figs. 1 and 2 thereof, the reference numeral 10 designates a self-starting alternating current motor of the synchronous type which, in the present instance, is used as the prime mover of a clock or other timing movement 12. The motor 10, which may be of any conventional kind, is in this instance like that shown and described in my copending application Ser. No. 397,719, filed December 11, 1953. Thus, the motor 10 comprises sets of alternate field poles 16 and 18 and a permanent-magnet rotor 20 (Figs. 1 to 3). The field poles 16 are provided by a field piece 22 having a base 24 which may conveniently be riveted at 26 to one end of a central core or post 28 in the manner shown in Fig. 2. The other field poles 18 are provided by a field piece 30 having a base 32 which is riveted at 34 to the opposite end of the central core 28. The field pieces 22 and 30 with their respective field poles 16 and 18 are of any suitable non-permanent magnetic material, and the central core 28 may be of the same non-permanent magnetic material. Surrounding the core 28 and interposed between the bases 24 and 32 of the field pieces 22 and 30 is a field coil 36 which may be connected to any suitable source of alternating current in order to magnetize the field poles 16 and 18 and change their opposite polarities in phase with the current.

Pressfitted or otherwise secured in the core 28 centrally thereof is a fixed motor shaft or stem 38 on which the rotor 20 is journalled, in this instance through intermediation of a part 40 to be described. The motor 10 may conveniently be mounted at 42 on a bracket 44 on one of the usual end plates of the movement 12, in this instance the end plate 40. Preferably interposed between the mounting bracket 44 and the field piece 22 is a spacer 48 of non-magnetic material.

As already mentioned, the instant motor 10 is, in the example shown, the prime mover of a clock movement, and the motor torque is to this end transmitted to the minute arbor 50 (Fig. 2) through a gear train 52 of the speed-reduction type. The gear train 52 comprises the aforementioned part 40, which is a worm that is in permanent mesh with a worm gear 54 on a staff 56. Rotatable in unison with the worm gear 54 on the same staff 56 is a pinion 58 which permanently meshes with a larger gear 60 on a staff 62, and turnable in unison with the gear 60 on the same staff 62 is a pinion 64 which is in permanent mesh with a larger gear 66 on the minute arbor 50. The staffs 56 and 62, as well as the minute arbor 50, may suitably be mounted in the opposite end plates of the movement. The end plates of the movement may be held in spaced parallel relation by conventional pillars 68 therebetween.

To effect reversal of rotor 20 should initial rotation thereof occur in the undesired direction upon energization of the field coil 36, there is provided a control 70 which comprises impact or stop elements 72 and 74, and further includes the aforementioned worm 40 and worm gear 54. The worm 40, which constitutes the first gear of the train 52, is drivingly connected with the rotor 20 by carrying the same. More particularly, the rotor 20 is pressfitted or otherwise mounted on a shank 76 of the worm 40, and the latter is journalled and axially slidable or floatable on a reduced shank 78 of the motor shaft 38. Provided on the motor shaft 38 is an annular shoulder 80 which in this instance serves as a stop shoulder or thrust bearing for the worm 40 in its normal driving position (Fig. 2). The stop element 72 is, in the present instance, a ratchet wheel which is carried at the outer end of the worm 40 and has in its outer face 82 a plurality of teeth 84 which provide stop or impact shoulders 86 (see also Figs. 3 and 4). The other stop element 74 is in the form of a pawl which is fixedly mounted on the movement plate 46. More particularly, the pawl 74 is pivoted on a pin 90 on the plate 46 and is clamped thereto in angularly adjusted position by a screw 92 which extends through an arcuate slot 94 in the pawl and is threadedly received by the plate 46.

During normal correct drive of the motor 10 the ratchet wheel 72 will be out of operative relation with the pawl 74 (Fig. 2), but the former is adapted to move into operative relation with the latter immediately on a wrong-direction start of the motor and reverse the drive of the latter. In the present instance, the correct drive of the rotor is clockwise as viewed in Fig. 3, and it follows from the exemplary helix angle of the worm in Fig. 1 that the thrust imparted by the teeth of the worm gear 54 to the worm 40 is to the left as viewed in Fig. 2, and this thrust is taken up by the thrust shoulder or bearing 80 on the motor shaft. Accordingly, when the motor 10 runs in the right direction, the worm 40 is urged into its normal driving position (Figs. 1 and 2) in which the ratchet wheel 72 is clearly out of operative relation with the pawl 74, and the motor torque will be transmitted to the minute arbor 50 through the gear train 52.

When the motor 10 self-starts in the wrong direction, i. e. counterclockwise as in Fig. 3, the thrust imparted by the teeth of the worm gear 54 to the worm 40 is to the right as viewed in Figs. 2 and 4, and since the driving worm is free to float in this direction it will follow the path of least resistance and quickly screw-advance in that direction rather than drive the worm gear 54 and the load of the parts connected therewith, bringing thereby the ratchet wheel 72 into quick operative relation with the pawl 74 for impact of its nearest shoulder 86 with the pawl and its rebound therefrom for immediate reversal of the motor drive. This is clearly shown in Fig. 4 in which the worm 40 is removed from its normal driving position, i. e. is spaced from the thrust shoulder or bearing 80 on the motor shaft 38, and the ratchet wheel 72 is in operative relation with the pawl 74. Once the drive of the rotor 20 is thus reversed the same will continue to run in the right direction and drive the gear train 52. Immediately on reversal of the wrong drive of the rotor 20 in this manner, the thrust imparted by the teeth of the worm gear 54 to the worm 40 will immediately urge the latter from the position in Fig. 4 back into the normal driving position in Fig. 2 in which the worm bears against the thrust shoulder or bearing 80 on the motor shaft 38.

In the example shown and described, the worm 40 and worm gear 54 not only form part of the unidirectional drive control 70 of the motor, but form also part of the gear train 52 which drives the minute arbor 50. It is, of course, fully within the purview of this invention to provide the unidirectional drive control 70 of the motor separately from any utility drive from the rotor, in which case it is merely necessary to provide in any suitable manner, as by friction, for instance, for sufficient rotational resistance of the worm gear 54 to compel the worm 40 to creep in screw fashion into its reversing position (Fig. 4) when the motor self-starts in the wrong direction. Also, while the preferred embodiment of this invention shown in the drawings provides the rotary stop or impact element 72 on the worm 40, it is fully within the purview of this invention to use the rotor 20 as the rotary impact element and arrange the fixed stop or impact element 74 so that the same will cooperate with either side of the rotor when the latter starts in the wrong direction. Moreover, while in the example shown and described the worm 40 and worm gear 54 form the initial gears in the gear train 52, it is also within the purview of the invention to arrange the worm 40 and worm gear 54 as intermediate gears in the gear train 52 in the same association with the stop or impact elements 72 and 74 in order to achieve quick reversal of the motor drive whenever the motor starts in the wrong direction.

Among the advantages of the instant unidirectional drive control 70 is the fact that, if the worm 40 and worm gear 54 form also part of a drive from the rotor and constitute the initial elements of the drive, as shown, even momentary transmission of possibly harmful motor torque in the wrong direction by any element of the drive is impossible, and none of the operatively connected elements of the drive will be driven in the wrong direction, except the worm 40 which, however, will not impart its wrong-direction drive to the worm gear 54 with which it is in direct mesh. In addition, to arrange the rotor 20 so that the same is turnable and axially floatable with the worm 40 makes for an exceedingly simple driving connection between them and nevertheless permits the floatable arrangement of the worm which is imperative for the performance of the unidirectional drive control. A further advantage is the mounting of the rotor 20 on the worm 40 and the journaled and sliding support of the latter, rather than of the rotor, on the motor shaft, for the worm 40 may thus utilize a much longer bearing surface on the motor shaft which will easily withstand the bending stresses induced by the thrust components from the meshing teeth of the worm and worm gear which are directed toward the rotary axis of the worm.

While the drawings show, and the foregoing description refers to, the elements 40 and 54 as a worm and worm gear, respectively, it is, of course, fully within the purview of this invention to substitute helical or screw gearing for the worm 40 and worm gear 54 for the successful performance of the unidirectional drive control. Accordingly, the reference in the appended claims to gears or gear elements or members with helical teeth is meant to describe either a worm and worm gear or screw gears. Obviously too, the worm gear 54 may, if of sufficiently thin section, be merely a plain spur gear whose teeth need not be helically inclined.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A directional drive control for a self-starting alternating current motor having a rotor, comprising two gears in continuous meshing engagement, at least one of which is provided with helical teeth and is drivingly connected with said rotor and axially floatable to and from a normal driving position, and the other gear offers sufficient rotational resistance to compel said one gear, on a wrong-direction start of said rotor, to move axially from said normal driving position, and impact means engaged on such axial motion of said one gear to effect the rebounding and reverse rotation of the rotor drive.

2. A directional drive control for a self-starting alternating current motor having a rotor, comprising two gears with meshing helical teeth of which one gear is drivingly connected with said rotor and axially floatable to and from a normal driving position, and the other gear offers sufficient rotational resistance to compel said one gear, on a wrong-direction start of said rotor, to screw from its normal driving position; and impact means operative on axial motion of said one gear from its normal driving position to reverse the rotor drive.

3. A directional drive control for a self-starting alternating current motor having a rotor, comprising two gears with meshing helical teeth of which one gear is drivingly connected with said rotor and axially floatable to and from a normal driving position, and the other gear offers sufficient rotational resistance to compel said one gear, on a wrong-direction start of said rotor, to screw from its normal driving position; and fixed and rotary impact members of which the rotary member is driven from said rotor and brought into impact and rebound relation with said fixed member for reversal of the rotor drive on axial motion of said one gear from its normal driving position.

4. A directional drive control for a self-starting alternating current motor having a rotor, comprising two gears with meshing helical teeth of which one gear is drivingly connected with said rotor and axially floatable to and from a normal driving position, and the other gear offers sufficient rotational resistance to compel said one gear, on a wrong-direction start of said rotor, to screw from its normal driving position; and two stops of which one is fixed and the other is provided on said one gear and brought by the latter, on axial motion from its normal driving position, into impact and rebound relation with said fixed stop for reversal of the rotor drive.

5. In a self-starting drive-controlled alternating current motor, the combination of a rotor element axially floatable to and from a normal running position; a gear element having helical teeth and being turnable and floatable with said rotor element; a gear member having helical teeth and being in permanent mesh with said gear element, said gear member offering sufficient rotational resistance to compel said gear element, on a wrong-direction start of said rotor element, to screw axially and move said rotor element from its normal running position; and two stops of which one is fixed and the other is provided on one of said elements and brought by the same, on axial motion of said rotor element from its normal running position, into impact and rebound relation with said fixed stop for reversal of the drive of said rotor element.

6. The combination in a self-starting drive-controlled alternating current motor as set forth in claim 5, in which said other stop is provided on said gear element.

7. A unidirectional torque-transmission drive for a self-starting alternating current motor having a rotor, comprising driving elements operatively connected with each other and with said rotor and including two gears with meshing helical teeth of which one gear drives the other gear and is axially floatable to and from a normal driving position, and the rotational resistance of said other gear compels said one gear, on a wrong-direction start of said rotor, to screw from its normal driving position; and impact means operative on axial motion of said one gear from its normal driving position to reverse the rotor drive.

8. A unidirectional torque-transmission drive for a self-starting alternating current motor having a rotor, comprising driving elements operatively connected with each other and with said rotor and including two gears with meshing helical teeth of which one gear drives the other gear and is axially floatable to and from a normal driving position, and the rotational resistance of said other gear compels said one gear, on a wrong-direction start of said rotor, to screw from its normal driving position; and fixed and rotary impact members of which the rotary member is driven by said rotor and brought into engagement with said fixed member on axial motion of said one gear from its normal driving position induced by a wrong-direction start, causing impact of said members to occur and rebounding of the rotor thereby reversing the rotor drive.

9. A unidirectional torque-transmission drive for a self-starting alternating current motor having a rotor, comprising driving elements operatively connected with each other and with said rotor and including two gears with meshing helical teeth of which one gear drives the other gear and is axially floatable to and from a normal driving position, and the rotational resistance of said other gear compels said one gear, on a wrong-direction start of said rotor, to screw from its normal driving position; and two stops of which one is fixed and the other is provided on said one gear and brought by the latter, on axial motion from its normal driving position, into impact and rebound relation with said fixed stop for reversal of the rotor drive.

10. A unidirectional torque-transmission drive for a self-starting alternating current motor as set forth in claim 9, in which said one gear is directly drivingly connected with said rotor and is the first torque-transmission element of said drive, so that none of said driving elements transmits rotor torque on a wrong-direction start of said rotor.

11. A unidirectional speed reduction drive from the rotor of a self-starting alternating current motor for a timing device, comprising a train of reduction gears drivingly connected with said rotor and including two gear elements with meshing helical teeth of which one gear element drives the other gear element and is axially floatable to and from a normal driving position, and the rotational resistance of said other gear element compels said one gear element, on a wrong-direction start of said rotor, to screw from its normal driving position; and impact means operative on axial motion of said one gear element from its normal driving position to reverse the rotor drive.

12. A unidirectional speed reduction drive from the rotor of a self-starting alternating current motor for a timing device, comprising a train of reduction gears drivingly connected with said rotor and including two gear elements with meshing helical teeth of which one gear element drives the other gear element and is axially floatable to and from a normal driving position, and the rotational resistance of said other gear element compels said one gear element, on a wrong-direction start of said rotor, to screw from its normal driving position; and fixed and rotary impact members of which the rotary member is driven from said rotor and brought into impact and rebound relation with said fixed member for reversal of the rotor drive on axial motion of said one gear element from its normal driving position.

13. A unidirectional speed reduction drive from the rotor of a self-starting alternating current motor for a timing device, comprising a train of reduction gears drivingly connected with said rotor and including two gear elements with meshing helical teeth of which one gear element drives the other gear element and is axially floatable to and from a normal driving position, and the rotational resistance of said other gear element compels said one gear element, on a wrong-direction start of said rotor, to screw from its normal driving position; and two stops of which one is fixed and the other is provided on said one gear element and brought by the latter, on axial motion from its normal driving position, into operative alignment with said fixed stop for impact therewith and rebound therefrom for reversal of the rotor drive.

14. A unidirectional speed-reduction drive of the type set forth in claim 13, in which said one gear element is directly drivingly connected with said rotor and is the first gear of said train, so that the remaining gears of said train will not be driven and none of the gears of said train will transmit rotor torque on a wrong-direction start of said rotor.

15. A directional drive control for a self-starting alternating current motor having a rotor, comprising two gears with meshing helical teeth of which one gear is drivingly connected with said rotor and axially floatable to and from a normal driving position, and the other gear offers sufficient rotational resistance to compel said one gear, on a wrong-direction start of said rotor, to screw from its normal driving position; and two stop elements fixed and carried by said one gear, respectively, one of said stop elements having angularly spaced stop surfaces and the stop element on said one gear being brought by the latter, on axial motion from its normal driving position, into operative relation with said fixed stop element for impact between one of said stop surfaces of said one stop element and the other stop element and rebound of the stop element on said one gear from said fixed stop element for reversal of the rotor drive.

16. A directional drive control for a self-starting alternating current motor as set forth in claim 15, in which said one stop element is carried by said one gear.

17. A directional drive control for a self-starting alternating current motor as set forth in claim 15, in which said one stop element is carried by said one gear and is in the form of a ratchet wheel having in one of its opposite faces teeth which form said stop surfaces, and the other stop element is a fixed pawl.

18. In a self-starting drive-controlled alternating current motor, the combination of a fixed motor shaft having a thrust bearing; a rotor element; a gear element having helical teeth, one of said elements carrying the other element and being journalled on said motor shaft and axially slidable thereon to and from a normal position in which it bears against said thrust bearing; a gear member having helical teeth and being in permanent mesh with said gear element, said gear member offering sufficient rotational resistance to compel said gear element, on a wrong-direction start of said rotor element, to screw axially and move said one element from its normal position; and impact means operative on axial motion of said one element from its normal position to reverse the drive of said rotor element.

19. In a self-starting drive-controlled alternating current motor, the combination of a fixed motor shaft having a thrust bearing; a rotor element; a gear element having helical teeth, one of said elements carrying the other element and being journalled on said motor shaft and axially slidable thereon to and from a normal position in which it bears against said thrust bearing; a gear member having helical teeth and being in permanent mesh with said gear element, said gear member offering sufficient rotational resistance to compel said gear element, on a wrong-direction start of said rotor element, to screw axially and move said one element from its normal position; and two stops of which one is fixed and the other is provided on said gear element and brought by the latter, on axial motion of said one element from its normal position, into operative relation with said fixed stop for impact therewith and rebound therefrom for reversal of the drive of said rotor element.

20. The combination in a self-starting drive-controlled alternating current motor as set forth in claim 19, in which said gear element is journalled and axially slidable on said motor shaft, and said rotor element is carried by said gear element.

21. The combination in a self-starting drive-controlled alternating current motor as set forth in claim 19, in which said fixed stop is adjustable axially of said gear element.

References Cited in the file of this patent

UNITED STATES PATENTS

| 2,452,178 | Brownlee | Oct. 26, 1948 |
| 2,464,847 | Coffey | Mar. 22, 1949 |